US011887375B2

(12) United States Patent
Guzik et al.

(10) Patent No.: US 11,887,375 B2
(45) Date of Patent: Jan. 30, 2024

(54) TECHNIQUES FOR CAPTURING ENHANCED IMAGES FOR PATTERN IDENTIFICATIONS

(71) Applicants: Getac Technology Corporation, Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, Taipei (TW); WHP Workflow Solutions, Inc., South Charleston, NC (US)

( * ) Notice: Subject to any disclaimer, the term of this patent is extended or adjusted under 35 U.S.C. 154(b) by 0 days.

(21) Appl. No.: 17/352,158

(22) Filed: Jun. 18, 2021

(65) Prior Publication Data
US 2022/0405514 A1  Dec. 22, 2022

(51) Int. Cl.
G06V 20/58 (2022.01)
H04L 67/12 (2022.01)
G06V 20/05 (2022.01)

(52) U.S. Cl.
CPC .............. *G06V 20/05* (2022.01); *H04L 67/12* (2013.01)

(58) Field of Classification Search
None
See application file for complete search history.

(56) References Cited

U.S. PATENT DOCUMENTS

| 10,081,314 B2 | 9/2018 | Fleming et al. |
| 10,755,613 B2 | 8/2020 | Brubaker |
| 2007/0031008 A1 | 2/2007 | Miyahara |
| 2007/0242153 A1 | 10/2007 | Tang et al. |
| 2012/0008832 A1 | 1/2012 | Wang et al. |

(Continued)

FOREIGN PATENT DOCUMENTS

| JP | 2018531474 A | 10/2018 |
| KR | 101442160 B1 | 9/2014 |

(Continued)

OTHER PUBLICATIONS

International Patent Application No. PCT/US2022/033117, International Search Report and Written Opinion dated Oct. 6, 2022, 8 pages.

(Continued)

*Primary Examiner* — Samuel D Fereja

(57) ABSTRACT

This disclosure describes techniques for capturing still images during video streaming to identify patterns in a region-of-interest on the captured still images. The video streaming may be performed by an imaging device that includes or is communicatively connected to one or more sensors (e.g., radar, light sensor, etc.) The one or more sensors may be configured to perform data measurements such as vehicle speed measurements, light intensity measurements, and/or the like. In one example, during the video streaming, the data measurement may be compared with a corresponding threshold. In this example, the imaging device may be triggered to capture still images of the surrounding area based on the comparison between the data measurement and the corresponding threshold. Thereafter, the still images may be processed to identify the region-of-interest on the still images.

20 Claims, 9 Drawing Sheets

(56) References Cited

U.S. PATENT DOCUMENTS

| | | | |
|---|---|---|---|
| 2012/0260277 A1* | 10/2012 | Kosciewicz | H04N 17/004 |
| | | | 725/31 |
| 2017/0161593 A1 | 6/2017 | Smithson et al. | |
| 2017/0178345 A1* | 6/2017 | Pham | G06V 10/758 |
| 2018/0025636 A1 | 1/2018 | Boykin et al. | |
| 2018/0060675 A1* | 3/2018 | Ji | H04N 5/2351 |
| 2020/0334977 A1* | 10/2020 | Tang | G06K 7/1417 |
| 2021/0168288 A1 | 6/2021 | Ll et al. | |
| 2021/0312725 A1* | 10/2021 | Milton | G06N 3/0454 |

FOREIGN PATENT DOCUMENTS

| | | | |
|---|---|---|---|
| KR | 20210042591 A | 4/2021 | |
| WO | 2017173017 A1 | 10/2017 | |

OTHER PUBLICATIONS

International Patent Application No. PCT/US2022/033119, International Search Report and Written Opinion dated Oct. 11, 2022, 10 pages.

\* cited by examiner

TECHNIQUES FOR CAPTURING ENHANCED IMAGES FOR PATTERN IDENTIFICATIONS

BACKGROUND

Law enforcement agencies provide officers and agents with an assortment of devices—electronic and otherwise—to carry out duties required of a law enforcement officer. Such devices include radios (in-vehicle and portable), body-worn cameras, weapons (guns, Tasers, clubs, etc.), portable computers, and the like. In addition, vehicles such as cars, motorcycles, bicycles, and SEGWAYs are typically equipped with electronic devices associated with the vehicle, such as vehicle cameras, sirens, beacon lights, spotlights, personal computers, etc.

It is increasingly common for law enforcement agencies to require officers to activate cameras (body-worn and vehicle-mounted) that enable officers to capture audio and/or video of incidents in which an officer is involved. This provides a way to collect and preserve evidence, that would otherwise be unavailable, for subsequent legal proceedings. This evidence greatly aids in the investigation of criminal activities, identification of perpetrators of crimes, and examination of allegations of police misconduct, to name a few advantages.

It is also desirable in many circumstances that the captured audio and/or video contents are processed and leveraged to improve law enforcement functions.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
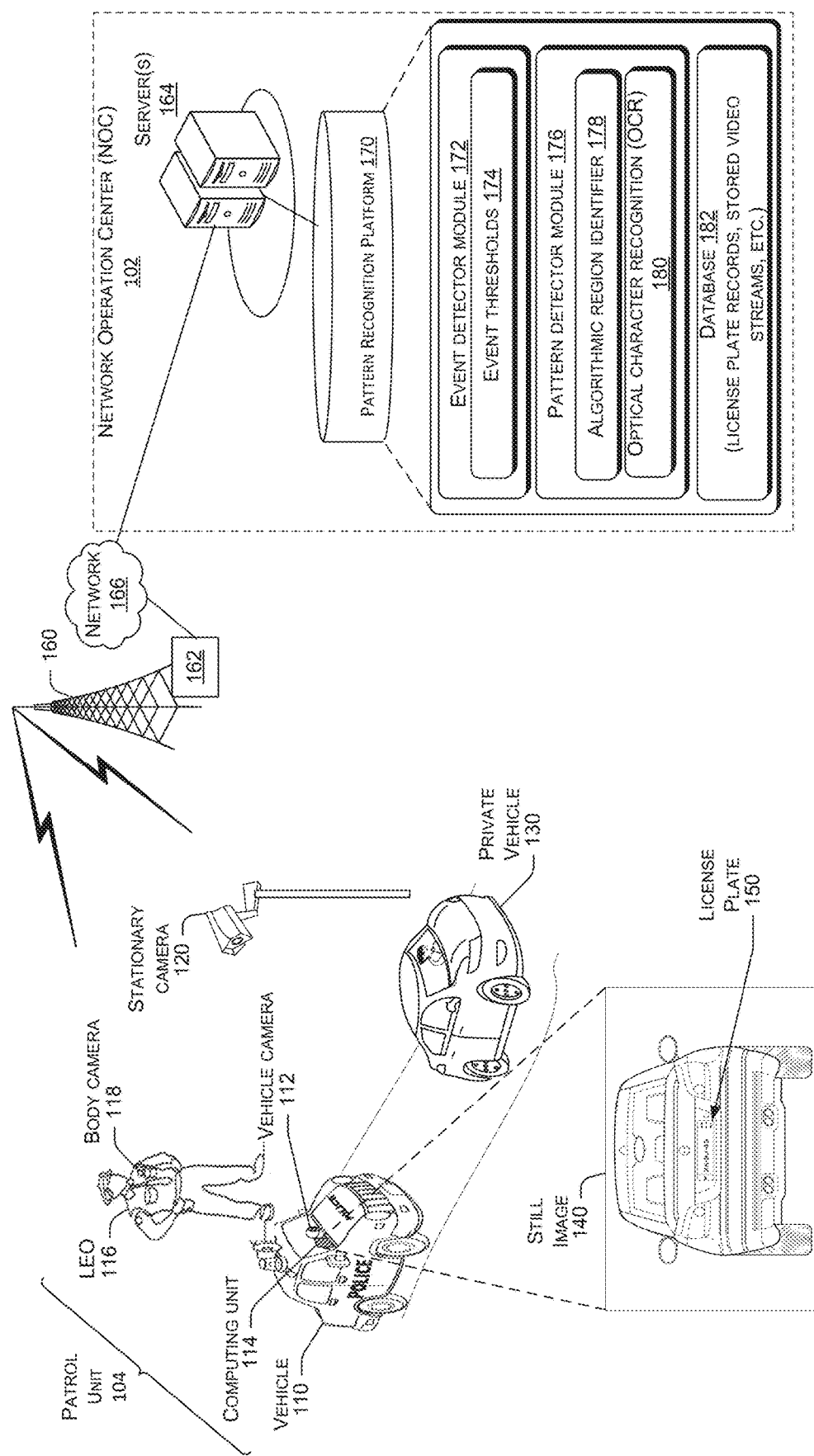
FIG. 1 illustrates an example architecture that implements capturing of still images during video streaming for pattern identifications.

This disclosure is directed to techniques of capturing still images during video streaming to identify patterns in a region-of-interest on one or more captured still images. The video streaming may be performed by an imaging device that includes or is communicatively connected to one or more sensors (e.g., radar, light sensor, etc.). The one or more sensors may be configured to perform data measurements such as vehicle speed measurements, light intensity measurements, and/or the like. In one example, during the video streaming, the data measurement may be compared with a corresponding threshold. The threshold may include a pre-configured value to detect an occurrence of an event that can trigger the capturing of the still images. In this example, the imaging device may be triggered to capture one or more still images of the surrounding area based on the comparison between the data measurement and the corresponding threshold. Thereafter, an algorithm may be applied to the one or more still images to identify the region-of-interest on the still images. For example, the region-of-interest includes vehicle license plates, traffic signs, public advertisements, and/or the like. Upon identification of the region-of-interest, another algorithm such as optical character recognition (OCR) can be utilized to identify the patterns such as the characters of the vehicle license plate. This technique of automated capturing of the one or more still images for pattern recognition may improve, for example, the efficiency of law enforcement operations and other purposes such as self-driving cars where traffic signs can be identified without human intervention.

In one example, the imaging device may be installed in a police vehicle to capture and stream video to a network operation center (NOC). The camera may include one or more sensors such as radar, microphone, or a light sensor, that can detect the speed of another vehicle, ambient sounds, or light intensity of surrounding areas, respectively. The NOC may include a server that can remotely manage imaging devices or cameras that can be deployed for law enforcement purposes or other similar applications. In this example, the NOC may receive one or more data measurements via the one or more sensors and compare each of the data measurements with a corresponding threshold. Given a situation that the data measurement exceeds the corresponding threshold, the NOC may remotely adjust configurations of the streaming imaging device to capture one or more still images at a higher resolution. In this case, the adjustment in configurations may include taking or capturing of one or more still images in addition to video streaming.

With the captured one or more still images, the NOC may use an algorithm to analyze the one or more still images and to identify the regions-of-interest. In one example, the algorithm may include an edge feature extraction to generate a saliency map of the still image. The saliency map of the still image may include a transformed image in which a brightness of a pixel can represent how salient the pixel is. The saliency map may be sometimes referred to as a heat map where hotness refers to the region-of-interest on the still image that has a big impact on predicting a class to which an object belongs. Upon generation of the saliency map, the region-of-interest may be downsampled and cropped to enhance the cropped image. Thereafter, the OCR algorithm may be trained on the cropped region-of-interest to identify the pattern such as characters of the vehicle license plate, traffic signs, and/or the like.

In alternative embodiments, after collecting data over time that include the captured still images, associated data measurements, and corresponding pattern identification, an event detector model may be generated from the collected data. The event detector model may include machine learning algorithms used to classify or categorize an input that includes a frame from a streaming video and/or data measurements from the one or more sensors. The classification may include detection of an occurrence of the event that can trigger the adjustment of configurations of the imaging device to capture one or more still images. By using the event generator model, the NOC may perform predictions of likelihood of occurrence of the event based upon a combination of one or more data measurements that can be used as input features to the event generator model. In one embodiment, the detection of the occurrence of the event may trigger the capturing of the still images during video streaming or to the video that may be stored locally and later uploaded to the NOC.

Although the embodiments described herein use the NOC as processor of data measurements and still images, the deployed imaging devices may similarly perform such functions. For example, the vehicle-mounted imaging devices may compare the captured one or more data measurements with corresponding thresholds in their databases, and thereafter adjust their respective configurations to capture the one or more still images in addition to the video streaming. With the captured one or more still images, these imaging devices may use an algorithm to analyze the one or more still images and to similarly identify the regions-of-interest. Additionally, the imaging devices may similarly use the event detector model to perform the predictions of the occurrence of the event based upon the combination of one or more data measurements.

As used herein, the terms "imaging device," "device," "portable device," "electronic device," and "portable electronic device" are used to indicate similar items and may be used interchangeably without affecting the meaning of the context in which they are used. Further, although the terms are used herein in relation to devices associated with law enforcement, it is noted that the subject matter described herein may be applied in other contexts as well, such as in a security system that utilizes multiple cameras and other devices.

The implementation and operations described above are ascribed to the use of the server; however, alternative implementations such as the use of the deployed imaging devices, recording devices that are capable of being worn or mounted to a person, and other similar portable devices may execute certain operations in conjunction with or wholly within a different element or component of the system(s). Further, the techniques described herein may be implemented in several contexts, and several example implementations and contexts are provided with reference to the following figures. The term "techniques," as used herein, may refer to system(s), method(s), computer-readable instruction(s), module(s)m algorithms, hardware logic, and/or operation(s) as permitted by the context described above and throughout the document.

Example Architecture

FIG. 1 illustrates a schematic view of an example architecture 100 that implements capturing of still images during video streaming for pattern identifications. In one example, during law enforcement operations, a patrol unit may deploy one or more cameras that can stream videos to a Network Operation Center (NOC). The NOC may include a server that can remotely manage configurations of the deployed cameras. In this example, the NOC may monitor an event based on one or more data measurements that can be detected from the streaming videos and/or via one or more sensors in each of the deployed cameras. The event may include an occurrence that can trigger the NOC to adjust the configurations of the deployed cameras. For example, a detected speeding vehicle may prompt a streaming camera to capture one or more still images of the detected speeding vehicle in addition to the streaming of video. In this example, the capturing of the one or more still images may use an enhanced resolution configuration as compared to the resolution of the taking of the streaming video. With the captured still images, the NOC may use an image processing technique to identify a region on the still image that includes or most likely to include a region-of-interest such as a shot of the sky to identify weather conditions, rear-side of a car to identify a vehicle license plate, window-side of the vehicle to identify a driver, and so on. Thereafter, the NOC may apply a separate algorithm to further identify patterns or information in the region-of-interest. For example, the NOC may apply an OCR algorithm on the region-of-interest of the still image to identify patterns such as characters of the vehicle license plate. This technique of automated detection of the region-of-interest and particularly, the identification of the vehicle license plates upon triggering by detected events may further assist law enforcement operations by facilitating immediate retrieval of associated information from a database, for ready access and processing of the information by law enforcement personnel and/or equipment.

The example architecture 100 may include a NOC 102 and an example patrol unit 104 that includes one or more of a law enforcement vehicle 110, a vehicle-mounted camera 112, a computing unit 114, and a law enforcement officer (LEO) 116 with a body camera 118. The example architecture 100 further shows a stationary camera 120 installed in a fixed public location, a private vehicle 130 that was pulled over by the patrol unit for illustration purposes, and an example still image 140 (captured by the vehicle camera 112) including a vehicle license plate 150 of the private vehicle 130.

The NOC 102 is generally a communication, command, and control system of the base architecture 100. In the present context, the NOC 102 may be part of a law enforcement agency or a facility that can be operated by a third party to offer services to the law enforcement agency. The NOC 102 may be used as a base from which to monitor patrol unit operations, gather and disseminate intelligence information, and control devices under the control of law enforcement officers with which it is in communication. For example, the NOC 102 may deploy cameras for law enforcement operations, receive video streams/uploaded videos and/or data measurements from the deployed cameras, process the data measurements to monitor the occurrence of events, perform pattern identifications, and respond with generated pattern identifications to the patrol units, LEOs, authorized persons after clearance verifications, and/or another agency or system for further processing.

In one example, the NOC 102 may include or be able to connect with a transmission tower 160 and a base station 162 that enable communications with the LEO 116, computing unit 114, vehicle camera 112, body camera 118, stationary camera 120, and/or other devices in other patrol units. NOC 102 further includes one or more servers 164 that may receive or transmit data to the patrol unit 104 via a network 166. The network 166 may be a local area network (LAN), a wide-area network (WAN), a carrier or cellular network, or a collection of networks that includes the Internet. Network communication protocols (TCP/IP, 3G, 4G, 5G, etc.) may be used to implement portions of the network 166.

In an embodiment, the one or servers 164 may include a pattern recognition platform 170 that can implement the capturing of enhanced still images for pattern recognition such as identifications of vehicle license plates, traffic signs, advertisements, and/or the like. The pattern recognition platform 170 may include an event detector module 172 with event thresholds 174, a pattern detector module 176 with an algorithmic region identifier 178 and an OCR 180, and a database 182. Each component or module of the pattern recognition platform 170 can be realized in hardware, software, or a combination thereof.

The pattern recognition platform 170 may be configured to include multiple functionalities. One functionality may include the processing of data measurements and video and/or audio data streams from the devices that were deployed for law enforcement purposes. The devices may include vehicle-mounted cameras, stationary cameras, and/or other types of imaging devices that can capture and upload/stream video and/or audio data. For example, the NOC 102 may receive—via the transmission tower 160 and the base station 162—video streams from the vehicle camera 112 during patrol operations. In this example, the pattern recognition platform 170 may process the received video streams by identifying the source of the streaming video and performing pattern identifications as further described in detail below.

Another functionality of the pattern recognition platform 170 may include using the event detector module 172 to detect an occurrence of an event based on one or more data measurements that can be taken by the deployed cameras and/or one or more sensors in each of the deployed cameras. The one or more data measurements may include detected vehicle speed measurements, audio-to-text translations, revolving high-intensity light measurements at a particular frequency such as when a light bar of the vehicle 110 is activated, tagged locations of the patrolling vehicles, and/or other measurements that may trigger the performing of the pattern identifications such as the capturing of enhanced images for vehicle license plate identifications. The one or more sensors in each of the deployed devices may include a radar or speed detector, light sensor, audio sensor, Global Positioning System (GPS), Lidar, gyroscope, thermocouple, motion detector, rain/snow/fog sensors, and/or the like. In an embodiment, the event detector module 172 may compare each of the detected one or more data measurements with a corresponding threshold stored in the event thresholds 174 to determine the occurrence of the event. The event thresholds 174 may store pre-configured values for vehicle speed measurements, text similarity thresholds, light intensity thresholds, similarity in locations, and/or the like. In this embodiment, the event detector module 172 may indicate the occurrence of the event when the at least one data measurement exceeds the corresponding threshold in the event thresholds 174.

For example, the vehicle camera 112 or a vehicle-mounted radar (not shown) detects the speed of the private vehicle 130 to be zero miles per hour or above a speed limit. In this example, the computing unit 114, which is in communicative connection with the vehicle camera 112 and the mounted radar, may send this data measurement to the NOC 102 while the vehicle camera 112 is streaming video at the same time. In another example, camera 112 may use audio-to-text translation algorithms to translate commands or audio instructions from the LEO 116 during patrol operations. In this other example, the text translations may be forwarded to the NOC 102 for further processing or comparisons with text similarity thresholds. In another example, the camera 112 or a light sensor (not shown) may detect bar lights of the vehicle 110 to be active such as when a revolving high-intensity light measurement at a fixed frequency is detected. In these examples, the event detector module 172 may compare the data measurement with the corresponding threshold to determine the presence or occurrence of the event as described herein.

In one example embodiment, the occurrence of the event may be used by the pattern recognition platform 170 as a reference for adjusting the configurations of the one or more cameras to capture the desired still images. The adjustment in the configurations may include capturing still images, blurring background images other than desired objects in a field of view of the camera, reducing color intensity, and/or the like. In one example, the pattern detector module 176 may capture the characters of the license plate 150, which can be the desired object for identification of the pulled-over private vehicle 130. In this example, the pattern detector module 176 may utilize the algorithmic region identifier 178 to capture an area or region of the still image 140 that includes or most likely to include the license plate 150 as the region-of-interest. Thereafter, the OCR 180 may be utilized to read the characters on the captured area or region-of-interest that includes the license plate 150.

The algorithmic region identifier 178 may implement an image processing technique that can algorithmically locate one or more regions that appear to be the desired object of interest on the still image 140. In one example, the object of interest on the still image 140 may include the vehicle license plate 150. Vehicle license plates across the different United States may include standard sizes of about 12×6 inches. In addition, these vehicle license plates may be constructed with reflective textures that provide a distinct degree of light intensity when compared to car paint or to a surrounding mounting location, which may be on or above bumper portions of vehicles. In this example, the algorithmic region identifier 178 may use a saliency detection to identify the region that includes or most likely to include the vehicle license plate 150 on the still image 140. The saliency detection may include a pre-processing step in computer vision that aims at finding areas on a particular image that appears to be visually salient as compared to other areas. Example implementations of detecting the regions that include the vehicle license plates are further described in FIGS. 4-5.

Database 182 may store information that supports operations of the NOC 102 as described herein. Database 182 may be located in the pattern servers 164 and/or can be found from remote locations such as third party servers or devices other than the servers 164. In one example, the database 182 may store license plate records, video streams from patrol units, captured still images and associated data measurements, algorithms, vehicle driver record information, vehicles associated with the license plate records, and/or other public records that relate to law enforcement operations. In this example, database 182 may support the generation of an event detector model that may be used as an alternative to detect a likelihood of occurrence of the event as further described in detail in FIG. 6 below.

Referring to patrol unit 104, the vehicle camera 112 may include an identification (ID) module (not shown) that identifies the vehicle camera 112 to the NOC 102. The vehicle camera 112 may capture audio and/or video and transmit the captured audio and/or video content to the NOC 102. The vehicle camera 112 may also include at least one sensor (not shown) such as radar, GPS, light sensor, and/or the like, that can be used for monitoring the occurrence of the event. Typically, vehicle camera 112 is in communicative connection with the vehicle computing unit 114. The vehicle computing unit 114 can be a type of computer commonly referred to as a personal computer, or it may be a specialized computer designed to operate within specialized parameters of a law enforcement role. The vehicle computing unit 114 is a part of a computer-assisted dispatch system, similar to those commonly in use by law enforcement agencies, and typically includes an audio/video recording function or a digital video recorder (DVR).

The stationary camera 120 is also shown to be located within the vicinity of patrol unit 104. The stationary camera 120 may include an ID module (not shown) that identifies the stationary camera 120 to the NOC 102. In one example, the stationary camera 120 may capture and stream captured videos to the NOC 102. Further, the stationary camera 120 may also include at least one sensor (not shown) such as radar, GPS, light sensor, and/or the like, that can be used for monitoring the occurrence of the event. Although the stationary camera 120 is shown as mounted on a fixed pole, the stationary camera 120 may be mounted to any other fixed object, such as a building, or it may be mounted to a mobile object.

In one example illustration, patrol unit 104 pulls over the private vehicle 130 for a detected speed violation, which includes a monitored event that exceeded the corresponding threshold in the event thresholds 174. In this example, the configurations of the vehicle camera 112 may be adjusted to capture one or more still images of the private vehicle 130 upon the detection of the speeding violation. The captured still images are then forwarded to the NOC 102 for further processing such as pattern identifications of the region-of-interest e.g., vehicle license plate 15.

Example Network Server Environment

Figure 2:
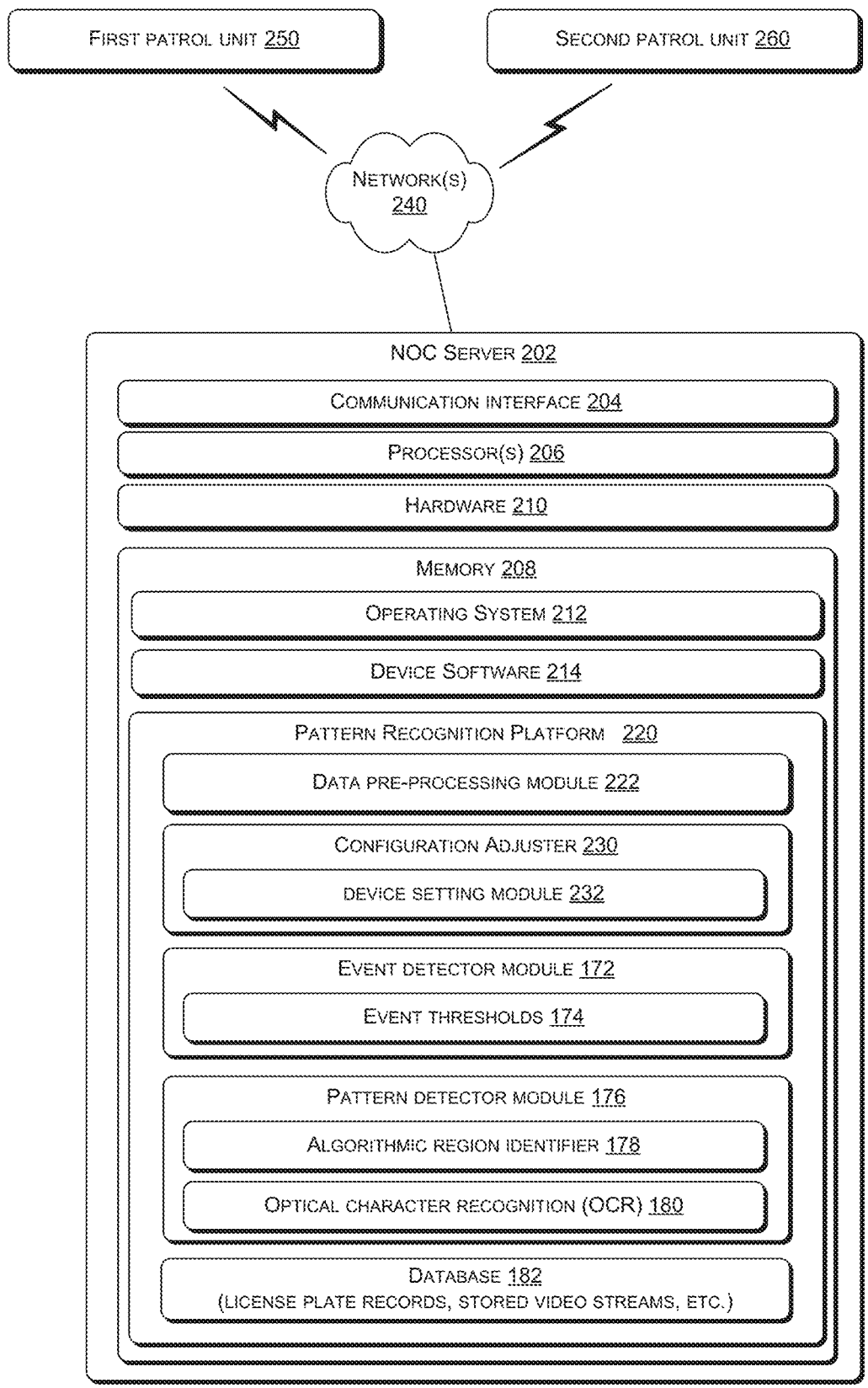
FIG. 2 is a block diagram of an example network server environment that may implement the capturing of enhanced still images during video streaming.

FIG. 2 is a block diagram of an example network server environment 200 that may implement the capturing of enhanced still images during video streaming. The one or more still images may be further processed for pattern identifications such as detecting and reading characters of vehicle license plates, traffic signs, billboards, or street advertisements, and/or the like. As shown, the network server environment 200 may include a NOC server 202 that corresponds to the server 164 of FIG. 1. The NOC server 202 may be communicatively connected, via a network 240, to a first patrol unit 250 and a second patrol unit 260 that can employ multiple cameras and sensors for streaming videos and gathering data measurements, respectively. Each of the first patrol unit 250 and the second patrol unit 260 may correspond to the patrol unit 104 of FIG. 1.

The NOC server 202 may include a communication interface 204, one or more processors 206, memory 208, and device hardware 210. The communication interface 204 may include wireless and/or wired communication components that enable the NOC server 202 to transmit or receive voice, audio, and/or data communication via the wireless carrier network, as well as other telecommunication and/or data communication networks. In one example, the communication interface 204 may facilitate receiving of streaming videos from deployed cameras and/or data measurements from one or more sensors in the first patrol unit 250 and the second patrol unit 260. The communication interface 204 may further send adjustments in configurations of the deployed cameras based on the received data measurements as described herein.

The memory 208 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 210 may include a modem that enables the NOC server 202 to perform data communication with the wireless carrier network. The device hardware 210 may further include signal converters (e.g., a digital-to-analog converter, an analog-to-digital converter), antennas, hardware decoders, and encoders, graphics processors, a universal integrated circuit card (UICC) or an embedded UICC (eUICC), and/or the like, that enable the NOC server 202 to execute applications and provide data communication functions.

The one or more processors 206 and the memory 208 may implement an operating system 212, device software 214, and a pattern recognition platform 220 that corresponds to the pattern recognition platform 170 of FIG. 1. Such software may include routines, program instructions, objects, and/or data structures that are executed by the processors 206 to perform particular tasks or implement particular abstract data types. The one or more processors 206 in conjunction with the pattern recognition platform 220 may further operate and utilize a data pre-processing module 222, a configuration adjuster 230 with a device setting module 232, and other components or modules of the pattern recognition platform 170 as described above in FIG. 1. Particularly, the other components or modules include the event detector module 172 with the event thresholds 174, pattern detector module 176 with the algorithmic region identifier 178 and OCR 180, and the database 182.

The operating system 212 may include components that enable the NOC server 202 to receive and transmit data via various interfaces (e.g., user controls, communication interface 204, and/or memory input/output devices). The operating system 212 may also process data using the one or more processors 206 to generate outputs based on inputs that are received via a user interface. For example, the operating system 212 may provide an execution environment for the execution of the pattern recognition platform 220. The operating system 212 may include a presentation component that presents the output (e.g., displays the data on an electronic display, stores the data in memory, transmits the data to another electronic device, etc.).

The operating system 212 may include an interface layer that enables the pattern recognition platform 220 to interface with the modem and/or the communication interface 204. The interface layer may comprise public APIs, private APIs, or a combination of both public APIs and private APIs. Additionally, the operating system 212 may include other components that perform various other functions generally associated with an operating system. The device software 214 may include software components that enable the network server to perform functions. For example, the device software 214 may include a basic input/output system (BIOS), bootrom, or a bootloader that boots up the NOC server 202 and executes the operating system 212 following power-up of the network device.

The pattern recognition platform 220, when executed, manages the processing of captured still images to generate the pattern identifications as described herein. The pattern recognition platform 220 may be a single block of executable instructions or it may be made up of several components. The components included in at least one implementation are described below. However, it is noted that in other implementations, more or fewer components may be configured and that one or more operations attributed to a particular component in the following description may be implemented in one or more other components.

The data pre-processing module 222 may process data streams such as streaming videos and data measurements from the deployed cameras and sensors, respectively. One functionality of the data pre-processing module 222 is to verify device identifications of the sources for the streaming video and/or data measurement. For example, the data pre-processing module 222 may identify the particular camera or cameras that streamed a particular video. In another example, data pre-processing module 222 may determine the device identifications of the one or more sensors that detected and transmitted the one or more data measurements. In these examples, the information of the cameras and sensors may be associated with the respective stored video streams and data measurements in the database 182. The database 182 may be integrated within the NOC server 202 and/or can be found in remote places such as in the cloud or third party provider.

The configuration adjuster 230 may facilitate adjustments of the configurations of the deployed cameras and/or sensors. In one example, the adjustment in configurations may include the capturing of one or more still images during video streaming or uploading by a particular imaging device or camera, changes in camera pixel resolutions for capturing the one or more still images, changes in frequency of taking data measurements by the sensors, and/or the like. In this example, the adjustment in configurations may be triggered by at least one data measurement that exceeds the event threshold. Further, the adjustments in configurations may also be prompted by detected events from the streaming videos. For example, a speeding vehicle may be determined based upon its location over different picture frames within a time period. In this example, the distance traveled by the speeding vehicle over the different picture frames may be divided by the time period to detect the vehicle speed via the streaming video.

The configuration adjuster 230 may use the device setting module 232 for adjusting the configurations of the cameras and/or the sensors in the field. The device setting module 232 may store current configurations of the cameras and/or sensors. Further, the device setting module 232 may include configuration history and recommended settings of each of the cameras and sensors for capturing still images and performing data measurements, respectively.

In one example, the event detector module 172 may receive the data measurements through the data pre-processing module 222. The data measurements may include an impulse noise, an audio-to-text translation, detected vehicle speed, an alert via manual entry by the LEO, and/or the like. In this example, the event detector module 172 may determine the occurrence of the event by comparing the data measurement with the corresponding threshold in the event thresholds 174. For example, the received impulse noise may include unwanted, almost instantaneous sharp sounds like clicks and pops typically caused by electromagnetic interference. In this example, the event detector module 172 may compare the received impulse noise with an impulse sound wave threshold. For example, the impulse sound wave threshold may be about 120 dB sound pressure level for gunfire. In another example, the audio-to-text translations may be compared with text equivalents of preconfigured words or phrases such as "officer down," "emergency," "search request," and/or the like. In this other example, the similarity with the text equivalents of stored preconfigured words or phrases may trigger the adjustment in the configurations of the cameras and/or sensors. In these examples, the event detector module 172 may detect the occurrence or presence of the event when the at least one data measurement is above the corresponding threshold.

Upon the detection of the event, the pattern detector module 176 may utilize the algorithmic region identifier 178 to isolate the region of the desired pattern to be identified. Given a situation where the vehicle license plates are to be identified during law enforcement operations, the algorithmic region identifier 178 may use, for example, an edge feature extraction to generate a saliency map of the still image. In this example, the edge feature extraction may generate an output that emphasizes a region-of-interest such as a vehicle license plate 150 of the still image 140 of FIG. 1. Thereafter, the region-of-interest may be cropped to enhance the desired image, and the OCR 180 may be trained on the cropped region-of-interest to identify the pattern.

In some embodiments, the event thresholds 174 may store a threshold for the number of characters in a standard vehicle license plate. For example, standard license plates may include a number of six characters as a threshold. In this example, a re-adjustment in configurations may be triggered when the identified characters on the vehicle license plate are less than the number of character-threshold. In this regard, the vehicle camera may be configured to capture one or more still images until the number of character-threshold is satisfied.

Example Device

Figure 3:
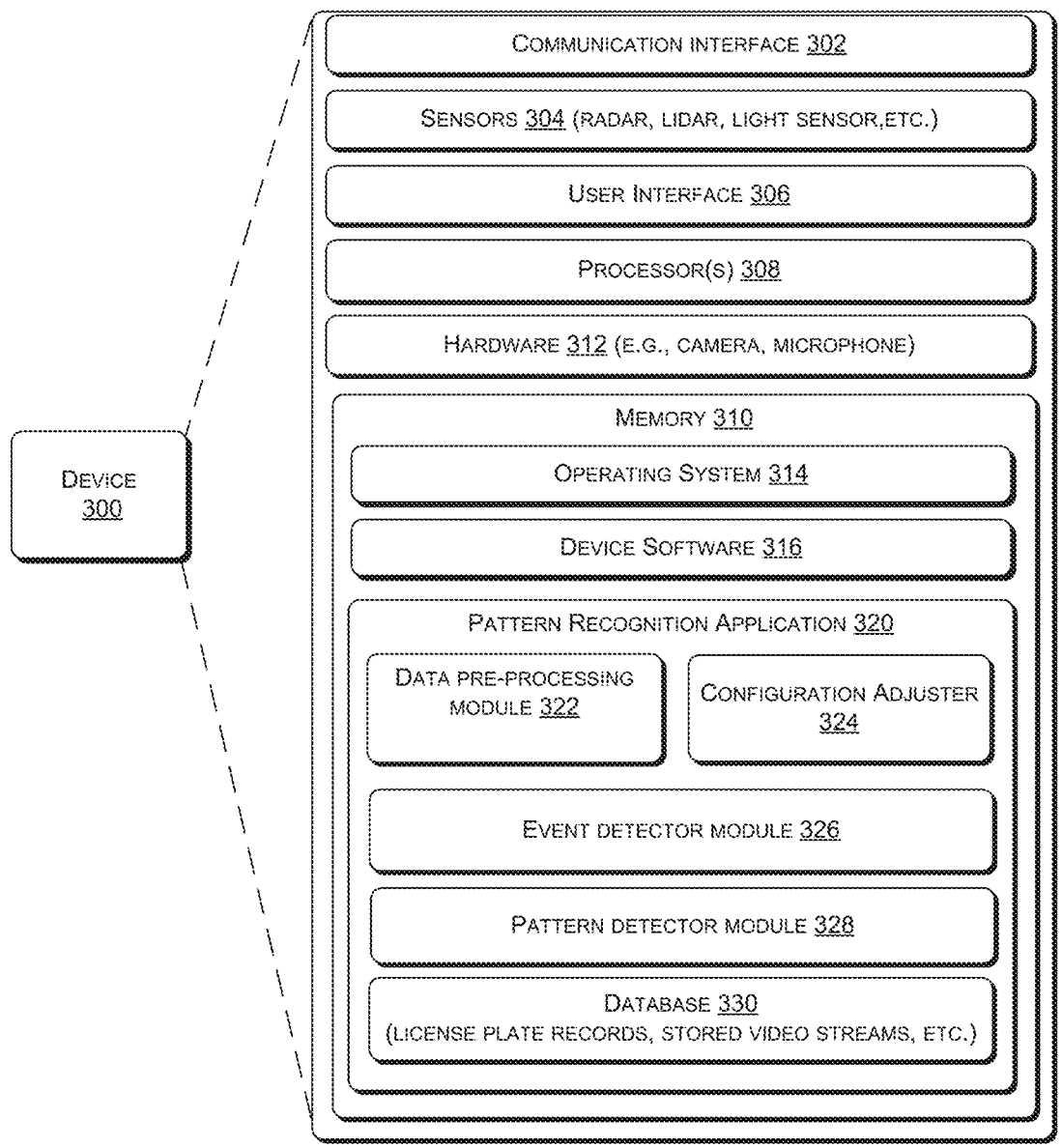
FIG. 3 is a block diagram of an example device that may be used to stream video and/or transmit data measurements to a network operating center (NOC) server.

FIG. 3 is a block diagram showing various components of a device 300 that may be used to stream video and/or transmit data measurements to the NOC server such as the NOC server 202 of FIG. 2. In one example, the device 300 may act as a client device that may be remotely managed by the NOC server 202. In this example, the configurations of the device 300 may be controlled by the NOC server 202 to capture still images that can be forwarded to the NOC server 202 for further processing such as pattern identifications. Alternatively, the device 300 may perform a scaled version of implementing the capturing of the still images for pattern identifications as described in the network server environment 200 of FIG. 2. In this regard, the device 300 may use the resources of the NOC server 202 and implement the pattern identifications over a larger number of other devices. As described herein, the device 300 may include a camera or other types of an imaging device, a cellular phone, a smartphone, a laptop, a video device, a tablet, a smart device, a wearable device, or any other similar functioning device The device 300 may include a communication interface 302, one or more sensors 304, a user interface 306, one or more processors 308, memory 310, and device hardware 312. The communication interface 302 may include wireless and/or wired communication components that enable the device to stream video, transmit still images, and/or send data measurements that were detected or monitored by the sensors 304. The sensors 304 may include a radar or speed detector, light sensor, audio sensor, GPS, Lidar, gyroscope, thermocouple, motion detector, snow/rain/fog sensors, and/or the like. In one example, the one or more sensors 304 may include Internet-of-Things (IoT) devices that may be positioned outside of the device 300 but communicatively connected at least to the processors 308.

The user interface 306 may enable a subscriber to enter inputs and read outputs. The user interface 306 may include a data output device (e.g., visual display, audio speakers), and one or more data input devices. The data input devices may include but are not limited to, combinations of one or more keypads, keyboards, mouse devices, touch screens, microphones, speech recognition packages, and any other suitable devices or other electronic/software selection methods.

The memory 310 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 312 may include a modem that enables the device 300 to perform data communication with the wireless carrier network. The device hardware 312 may further include signal converters (e.g., a digital-to-analog converter, an analog-to-digital converter), antennas, hardware decoders, and encoders, graphics processors, a universal integrated circuit card (UICC) or an embedded UICC (eUICC), and/or the like, that enable the device 300 to execute applications and provide data communication functions.

The one or more processors 308 and the memory 310 may implement an operating system 314, device software 316, and a pattern recognition application 320. Such software may include routines, program instructions, objects, and/or data structures that are executed by the processors 308 to perform particular tasks or implement particular abstract data types. One or more processors 308 in conjunction with the pattern recognition application 320 may further operate and utilize a data pre-processing module 322, configuration adjuster 324, event detector module 326, pattern detector module 328, and a database 182. For purposes of capturing region-of-interest on the still images and identifying patterns in the captured region-of-interest, the functions and operations of the operating system 314 and the device software 316 may correspond to the functions and operations of the operating system 212 and device software 214 as described in the NOC server 202 of FIG. 2. Further, the functions and operations of the data pre-processing module 322, configuration adjuster 324, event detector module 326, pattern detector module 328, and the database 182 may correspond to the functions and operations of the data pre-processing module 222, configuration adjuster 230, event detector module 172, pattern detector module 176, and the database 182 of FIG. 2. As described herein, the phrase "correspond" may include similar or analogous in function.

In one example, the device 300 may use the hardware 312 for taking a video of surrounding areas during a patrol operation. The device 300 may similarly use the sensors 304 in obtaining data measurements such as speed of surrounding vehicles, light intensity, and so on. In this example, the device 300 may use the pattern recognition application 320 to compare at least one data measurement with the corresponding stored threshold in the event detector module 326. Given a situation where the at least one data measurement may be above the corresponding threshold, then the processors 308 may adjust configurations of the hardware 312 to capture still images. The still images my be further processed by the pattern detector module 328 to find the region-of-interest and to identify patterns in the region-of-interest similar to techniques and methods as described in NOC server 202 of FIG. 2. Alternatively, the device 300 may function as an imaging device that can be remotely controlled by the NOC server 202. In this case, the NOC server 202 may receive the still images and process these still images to identify the patterns in the region-of-interest such as the vehicle license plates.

Example Identification of Region-of-Interest

Figure 4:
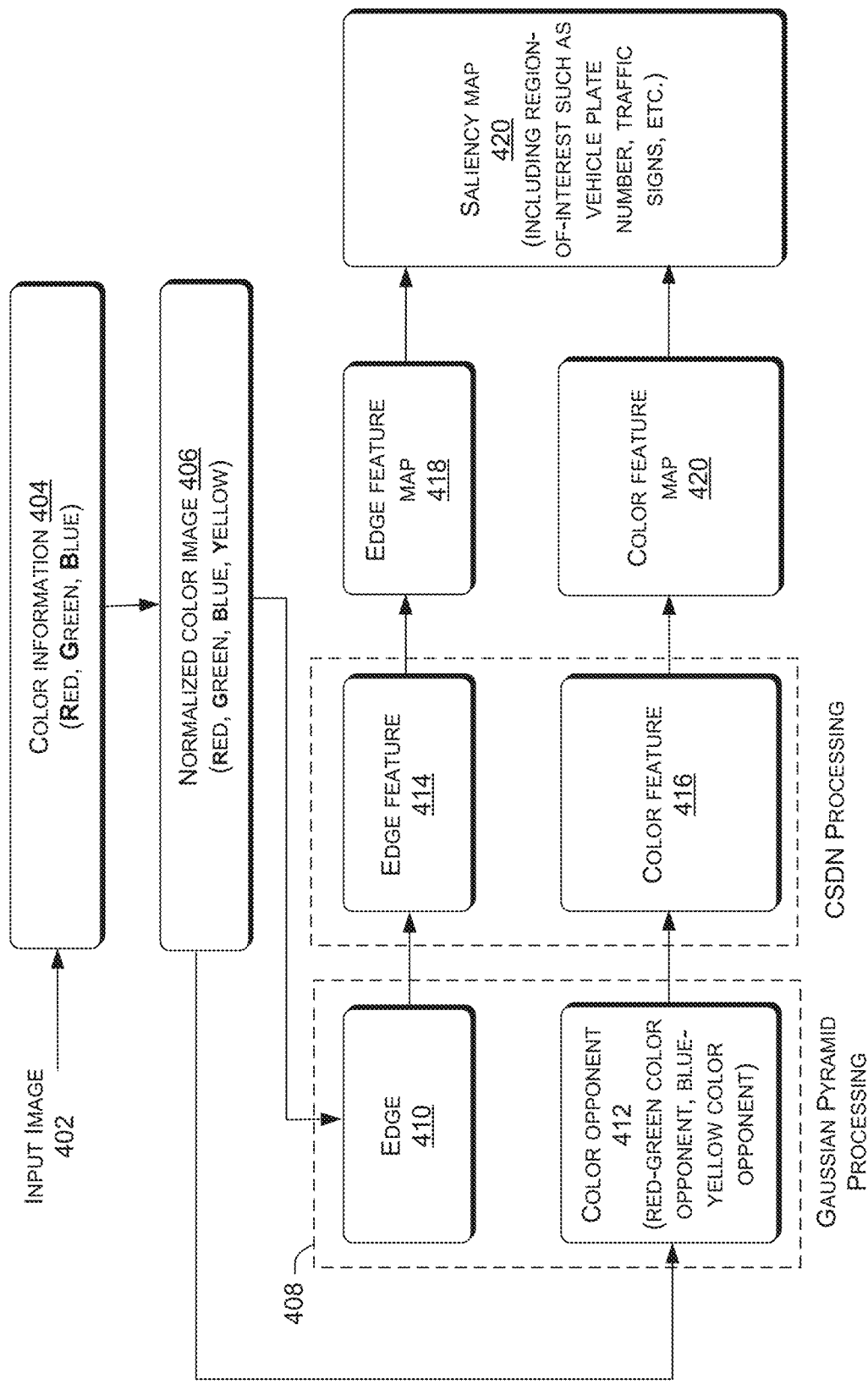
FIG. 4 is a block diagram of pre-processing the still image to generate a saliency map that can be used to identify a region-on-interest.

FIG. 4 is a block diagram 400 showing a pre-processing of the still image to generate a saliency map that can be used to identify the region-on-interest. The saliency map may include an image in which a brightness of a pixel can represent how salient the pixel is. The saliency map may be sometimes referred to as a heat map where hotness refers to the region-of-interest on the still image that has a big impact on predicting a class to which an object belongs to. For example, a still image such as the still image 140 of FIG. 1 may include basic features such as colors and edges that correspond to different light intensities when extracted. In this example, Gaussian pyramid processing may be used on the color features and edge features to generate color feature maps and edge features maps, respectively. Afterward, a mean of these extracted color feature maps and edge feature maps may be calculated to generate the saliency map. The saliency map may highlight the region-of-interest that can be further cropped for OCR identification as described below.

In one example, the extracting of the region-of-interest may include zooming out an input image 402 to limit a processing area for the input image 402. The input image 402 may correspond to the still image 140 of FIG. 1. In this example, the input image 402 may include an input color image. After zooming out the input image 402, a color information 404 such as red (R), green (G), and blue (B) color features can be extracted from the input color image. Further, normalized color image 406 such as red (r), green (g), blue (b), and yellow (y) can be calculated and extracted from the color information 404. With the color information 404 and the normalized color image 406, a Gaussian pyramid processing may be adopted to make a blur map and reduce noise influence in a variable scene and size of the region-of-interest (e.g., vehicle license plate).

For example, the Gaussian pyramid processing may generate Gaussian pyramid images 408 that include an edge 410 and color opponent 412. In this example, a center surround and different normalization (CSDN) algorithm may be used to extract an edge feature 414 and a color feature 416 from the edge 410 and color opponent 412, respectively. An edge feature map 418 and a color feature map 420 may be also generated from the edge feature 414 and color feature 416, respectively. By using respective weight factors for color feature map 420 and edge feature map 418, a saliency map 422 of the still image including the region-of-interest can be generated.

With the obtained saliency map, the region-of-interest such as a vehicle license plate 150 of the still image 140 in FIG. 1 may be downsampled and cropped to remove the background of the still image that is outside of the region-of-interest. Thereafter, the OCR may be applied to the cropped region-of-interest to identify the characters of the vehicle license plate, traffic signs, and/or the like.

Example Identification of Vehicle License Plate

Figure 5:
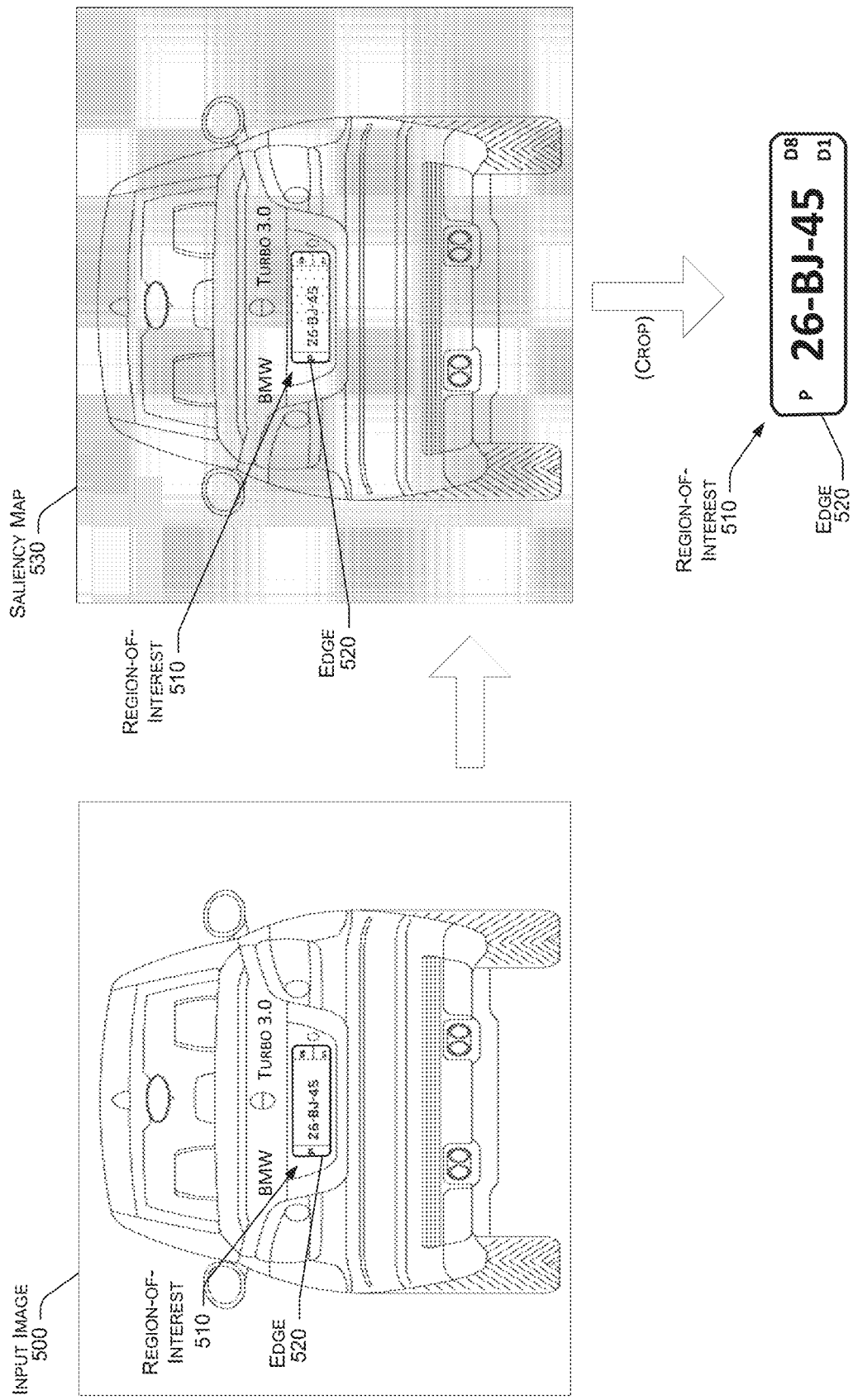
FIG. 5 is an example application of generating the saliency map of a particular still image to identify the region-of-interest.

FIG. 5 is an example application of generating the saliency map of a particular image to identify the region-of-interest. FIG. 5 illustrates an input image 500 including a region-of-interest 510 and an edge 520 that corresponds to a contour or shape of the region-of-interest 510. FIG. 5 also shows a saliency map 530 that may be generated after the processing of the input image 500. In one example, the pattern recognition platform may first zoom out the input image 500 to limit the processing area. The color information and the normalized color image of the input image 500 may be subsequently extracted for further Gaussian pyramid and CSDN processing to produce the respective edge feature map and color feature map as described in FIG. 4. Based on a weighted sum of the edge feature map and the color feature map, the saliency map 530 of the input image 500 can be generated.

In an example embodiment, the region-of-interest 510 may be cropped such that the rest of the background can be removed from the saliency map 530. With the removed background, only the patterns or characters that are within the region-of-interest 510 may be identified via, for example, the use of the OCR. In some cases, the standard number of characters in the vehicle license plate (e.g., three letters and three numbers) may be used as another event threshold to re-adjust the configuration of the camera to capture another set of one or more still images. For example, the application of the OCR after the initial detection of the occurrence of an event may identify a number of characters that is less than the total number of characters in the standard vehicle license plate. Here, the total number of characters can be used as a second or another threshold. In this example, the pattern recognition platform may prompt the imaging device to capture another set of one or more still images to be processed as described in the steps above.

Example Alternative Implementation of Event Detector Module

Figure 6:
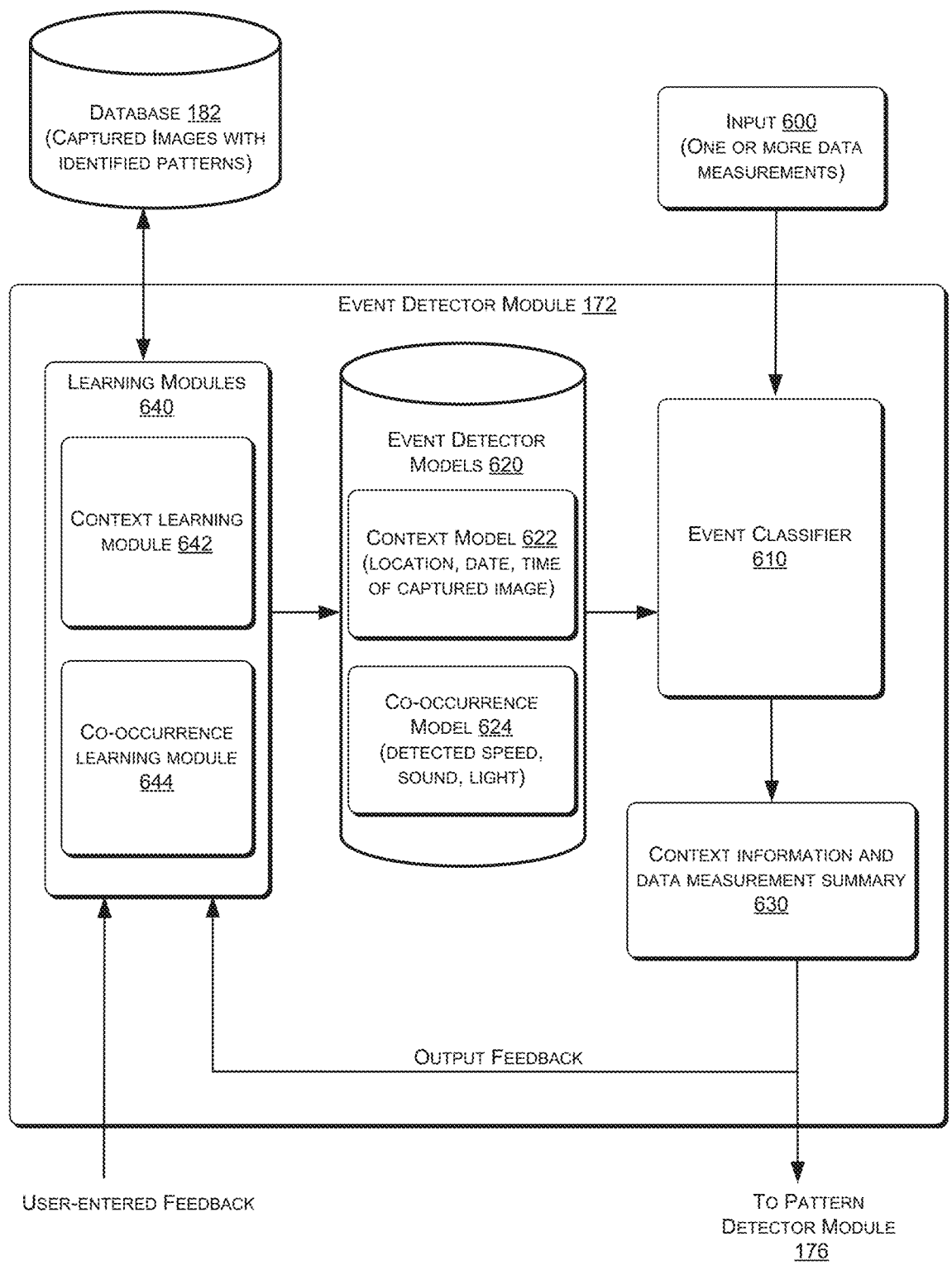
FIG. 6 is an example alternative implementation of an event detector module to detect an occurrence of an event that triggers capturing of one or more still images.

FIG. 6 is an example alternative implementation of the event detector module such as the event detector module 172 of the NOC server 202 in FIG. 2. In one example, the event detector module 172 may algorithmically identify likelihood of occurrence of the events using event detector models that can be derived from collected data of captured images, associated contextual data, associated data measurements and timestamps, and/or other information in the database 182. The event detector models may include machine learning models to algorithmically classify input data measurements that can trigger adjustments in the configurations of the imaging devices. In one example, when detecting a sound of gunfire during $4^{th}$ of July celebrations where fireworks can be predominant, the event detector models may use features other than a possible sound of the gunfire to determine the likelihood of occurrence of the event (gunfire). In another example, the capturing of still images may be based upon a current time and a particular location associated with the streamed video where stored data may show a likelihood of committed crimes at the same time and at the same particular location. In these examples, the event detector models may be generated from the stored data in the database 182 to determine the likelihood of occurrence of the events as described herein.

As shown, the event detector module 172 may receive an input 600 that can include video frames and/or one or more data measurements taken by the respective imaging device and at least one sensor in the deployed patrol units. The event detector module 172 may then use an event classifier 610 to classify the input 600 by training event detector models 620 to the input 600. The event detector models 620 may include a context model 622 and a co-occurrence model 624 that can utilize different combinations of features to classify or categorize the input 600. After classifying or categorizing the input 600, a context information and data measurement summary 630, which may include details of classified input data, may be displayed in a graphical interface of a user device. The event detector module 172 may further include learning modules 640 that can use historical data from the database 182, output feedback from the event classifier 610, and/or user-entered feedback to generate and/or update the event detector models 620. The learning modules 640 may include a context learning module 642 and a co-occurrence learning module 644 that can be used to generate and/or update the context model 622 and co-occurrence model 624, respectively. In some embodiments, the learning modules 640 and the event detector models 620 may be stored in the database 182 and retrieved by the event detector module 172 when performing the classification of the input 600.

In one example, the database 182 may store captured still images, date and timestamps of the captured still images, identified vehicle license plates, events that triggered the capturing of the still images, associated location, and timestamps of the detected events, and other associated context of the detected events from the user-entered feedback such as the presence of fireworks during holiday celebrations, clarity of the captured still images, the difficulty of identifying patterns in the captured still images, and/or similar user-entered remarks. Over time, these stored data can be used as training data to generate the event detector models 620. In one example, the learning modules 640 may include one or more machine learning algorithms that can be used to generate and/or update the event detector models 620. In this example, an administrator or a user may manually mark events in a manner that is proved to the machine learning algorithm. The machine-learning algorithm then builds correlations between input data (e.g., data measurements and/or contextual data) and output data (e.g., detected events) to generate the event detector models 620.

By way of illustration, if the machine learning algorithm in the learning modules 640 is a deep neural network, then values stored in various layers of the neural network may be adjusted based on the provided inputs and outputs from the training data. The deep neural network, which may be used by the event detector models 620, may be thereafter trained to the input 600 to determine the likelihood of occurrence of the event as described herein. In some cases, the trained event detector models 620 may output the likelihood that the input 600 corresponds to an event. This likelihood may be represented by a percentage that can be compared to a predetermined threshold.

In one example, a combination of the context model 622 and the co-occurrence model 624 may be used by the event classifier 610 to classify or categorize the input 600. The classification may include determining the likelihood of occurrence of event based upon a combination of features taken from the input 600. In one embodiment, the context model 622 may use features that include contextual data such as the user-entered feedback or remarks associated with previously detected events, patterns, or captured images. The contextual data may also include relevant information received from a third-party such as devices external to the NOC server 202. In one example, the user-entered feedback may include remarks regarding the presence of fireworks during a holiday celebration, weather conditions during the capturing of the still images, presence of other vehicles or buildings during the event, and/or similar relevant information that can be used as a feature for the training data. In this embodiment, the context model 622 may determine the likelihood of occurrence of the event based upon the contextual data associated with one or more data measurements from the input 600.

In some embodiments, the co-occurrence model 624 may use features that include the actual one or more data measurements from the deployed sensors. For example, the one or more data measurements may include detected speed of zero miles per hour or over-the-limit speed, timestamp and location of the detected over-the-limit, measured amount of rain, measured sound decibels of possible gunfire, measured light intensity, and/or the like. In this example, the co-occurrence model 624 may determine the likelihood of occurrence of the event based upon the combination of these one or more data measurements as features for the co-occurrence model. In other embodiments, the co-occurrence model 624 may use features that tend to co-occur with the at least one data measurement that triggered the adjustment of configurations of the imaging devices. Over time, a stronger logical relationship may be developed between the at least one data measurement that exceeded the corresponding threshold and the other data measurements that were not used to trigger the adjustment of configurations of the imaging devices. For example, the accuracy of speed detection may be unreliable during heavy snow. Given a situation where a particular speed measurement during heavy snow is determined to correspond to over-the-limit speeding during normal weather conditions, then the particular speed measurement may be used as a feature by the co-occurrence model 624 to determine the likelihood of occurrence of the event. In one embodiment, the learning modules 640 may use machine learning algorithms such as decision trees, linear regression, or logistic regression to generate and/or update the co-occurrence model 624 that can be used to classify the input 600.

In one embodiment, the event classifier 610 may combine the features of the context model 622 and the co-occurrence model 624 to classify the input 600. In this embodiment, a third model (not shown) may be derived from this combination of features to determine the likelihood of occurrence of the event based upon the actual one or more data measurements from the deployed sensors and the associated contextual data. For example, the third model may determine the likelihood of an occurrence of gunfire from the input 600. In this example, the third model may use features such as venue and date of the detected sound that may coincide with fireworks due to holiday celebrations and measurements in decibels of the sound. In this case, the third model utilizes the combination of the context model 622 feature (e.g., holiday celebration date) and co-occurrence model 624 feature (e.g., actual measurements of the sound) to determine the likelihood of occurrence of the event.

The context information and data measurement summary module 630 may include the breakdown of components of the contextual data and the data measurements. In one example, the context information and data measurements 630 may be displayed on the user device interface (not shown), and the LEO 116 in the patrol unit may enter user-entered feedback to be used as additional features that can be processed by the learning modules 640. In this example, the user-entered feedback information may be used to further update and refine the event detector models 620.

Example Implementation—Capturing Enhanced Images

Figure 7:
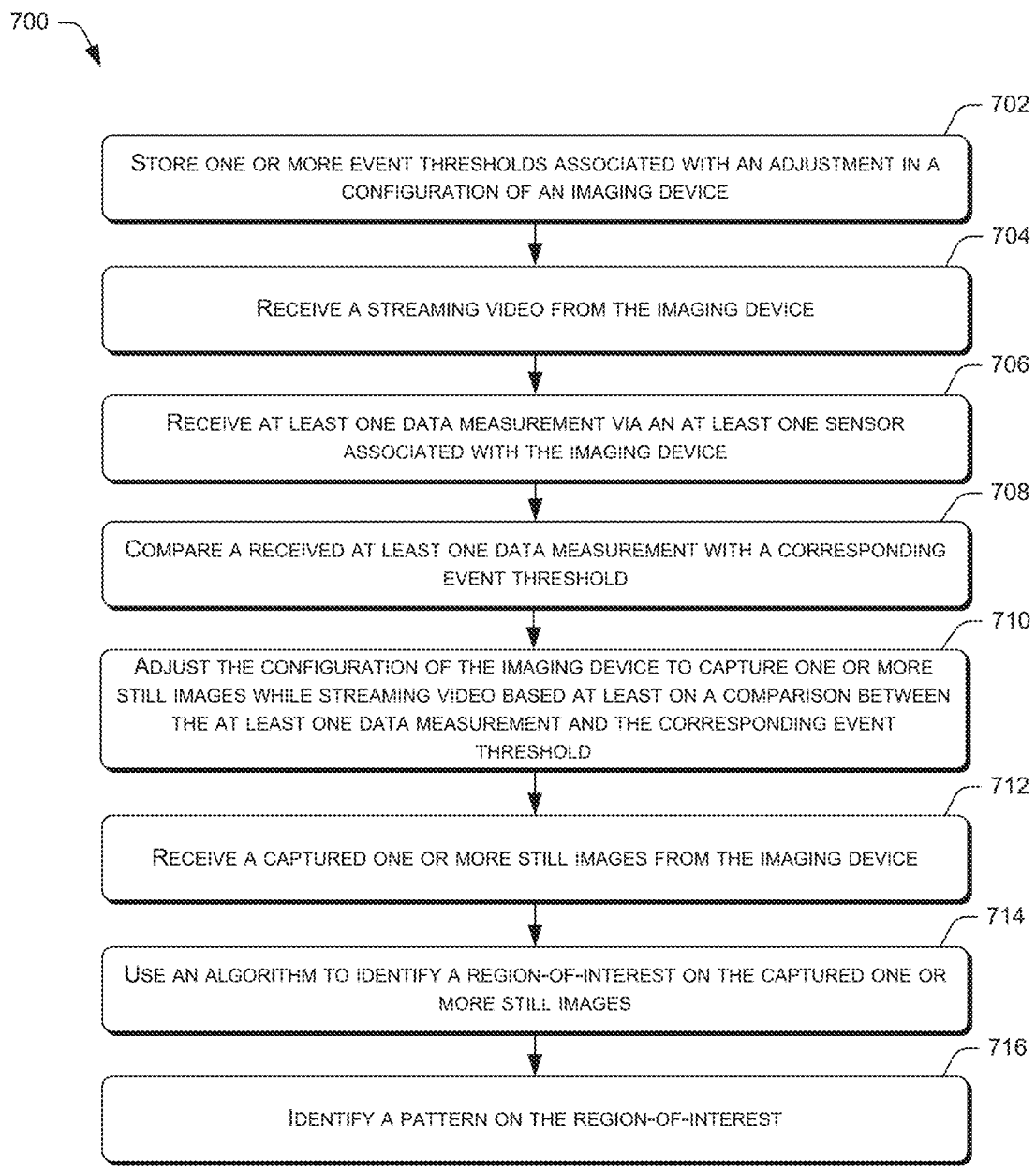
FIG. 7 is a flow diagram of an example methodological implementation for identifying a pattern on the region-of-interest on captured one or more still images.

FIG. 7 is a flow diagram 700 that depicts a methodological implementation of at least one aspect of the techniques for identifying a pattern on the region-of-interest in the captured one or more still images. In the following discussion of FIG. 7, continuing reference is made to the elements and reference numerals shown in and described with respect to the NOC server 202 of FIG. 2. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 702, the NOC server 202 may store one or more event thresholds associated with an adjustment in a configuration of an imaging device. In one example, the one or more event thresholds may include at least one of vehicle speed thresholds, a text similarity threshold, a light intensity threshold, a number of characters in a standard vehicle license plate threshold, and/or the like.

At block 704, the NOC server 202 may receive a streaming video from the imaging device. For example, the vehicle camera 112 of the patrol unit 104 may continuously stream videos of the road, other vehicles, traffic signs, and/or the like, during patrol operations by the patrol unit 104.

At block 706, the NOC server 202 may receive at least one data measurement via at least one sensor associated with the imaging device. For example, the patrol unit 104 may install radar, lidar, light sensor, GPS, and/or other sensors. In this example, the at least one data measurement may include vehicle speed measurement, audio-to-text translation, an impulse noise, or a revolving high-intensity light measurement at a fixed frequency.

At block 708, the NOC server 202 may compare a received at least one data measurement with a corresponding event threshold. For example, the corresponding threshold may include at least one of a vehicle speed thresholds, a text similarity threshold, an impulse sound wave threshold, or a light intensity threshold.

At block 710, the NOC server 202 may facilitate adjustments in the configuration of the imaging device to capture one or more still images while streaming video based at least on a comparison between the at least one data measurement and the corresponding event threshold. For example, the detected vehicle speed measurement is zero or above the vehicle speed threshold, the audio-to-text translation exceeds the text-similarity threshold, the impulse noise is above the impulse sound wave threshold, or the revolving high-intensity light measurement at the fixed frequency is greater than the light intensity threshold. In this example, the configuration of the imaging device may be adjusted to capture still images that can be indexed and forwarded to the NOC server 202 for further processing.

In one embodiment, the imaging device that can be mounted on the dashboard of a patrol car may be configured to stream videos using a first resolution that includes a low frames rate per second, low pixel resolutions, and/or the like, to save bandwidth during signal transmissions. Upon the detected occurrence of the event, the imaging device may be adjusted to capture still images using a second resolution (enhanced resolution) that can include adjustment of lens, shoot in burst mode, turn image stabilization ON, increase in pixel resolution, and/or the like. In another embodiment, the video frames from the streamed videos may be used to detect overspeeding of a subject car. In this case, the imaging device may be adjusted to focus on the moving object to capture still images. The moving object may be detected based on motion difference with background picture where the motion of the background and the moving object can be estimated by calculating optical flow between adjacent frames. Still in another embodiment, the imaging device may be adjusted via manual adjustment by the user such as when the NOC server 202 may display the context information and data measurement summary 630 in the user interface of the computing device in the patrol car.

At block 712, the NOC server 202 may receive a captured one or more still images from the imaging device.

At block 714, the NOC server 202 may use an algorithm to identify a region-of-interest on the captured one or more still images. For example, the NOC server 202 may generate a saliency map of a particular still image. In this example, the saliency map may be used to identify the region-of-interest such as the vehicle license plate on the still image.

At block 716, the NOC server 202 may identify a pattern on the region-of-interest. For example, the NOC server 202 may use the OCR to identify characters on the vehicle license plate.

Example Implementation—Identifying Characters in Vehicle License Plates

Figure 8:
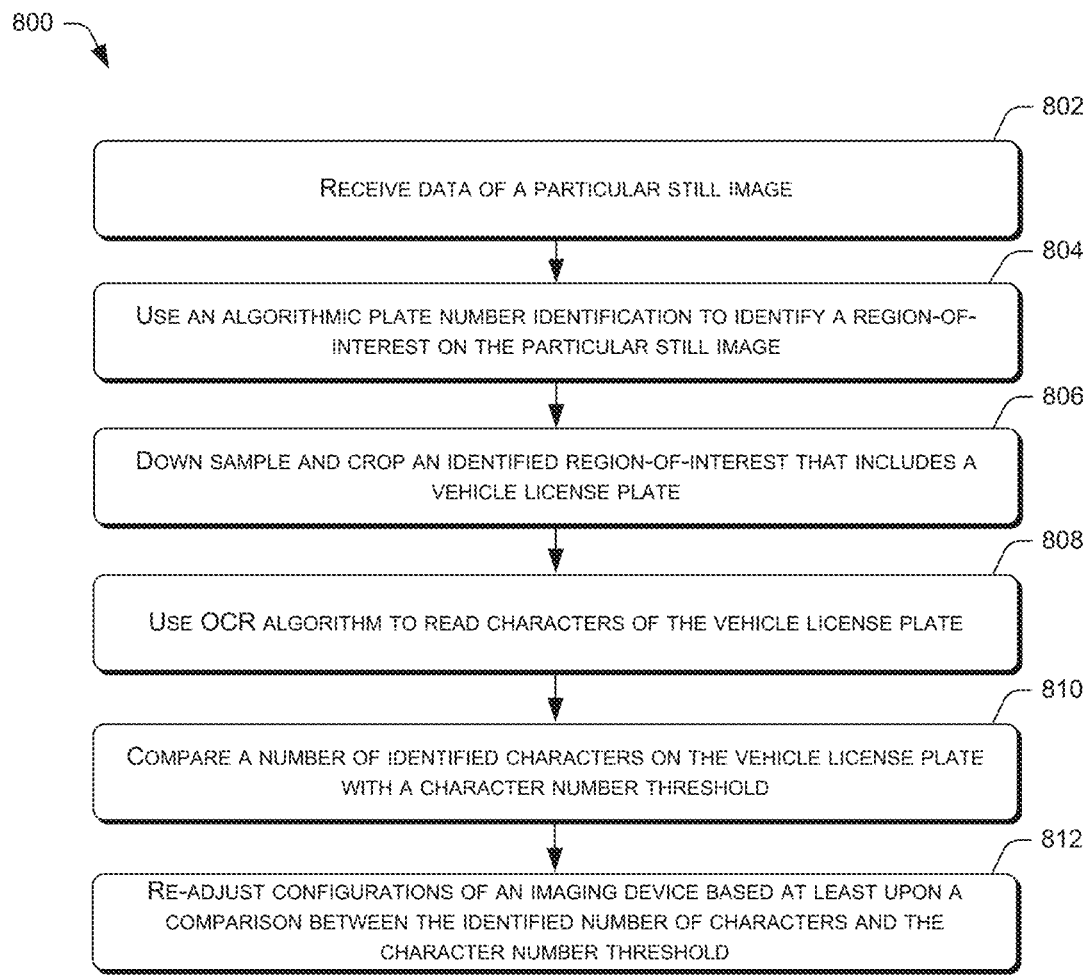
FIG. 8 is a flow diagram of an example methodological implementation for identifying characters of vehicle license plates.

FIG. 8 is a flow diagram 800 that depicts a methodological implementation of at least one aspect of the techniques for identifying characters of vehicle license plates. In the following discussion of FIG. 8, continuing reference is made to the elements and reference numerals shown in and described with respect to the NOC server 202 of FIG. 2. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 802, the NOC server 202 may receive data of a particular still image. For example, the data is an input file of the particular still image.

At block 804, the NOC server 202 may use an algorithmic plate number identification to identify a region-of-interest in the particular still image. The algorithmic plate number identification may include the calculating of the edge feature map and the color feature map of the still image. For example, the still image such as the still image 140 of FIG. 1 may include basic features such as colors and edges that correspond to different light intensities when extracted. In this example, Gaussian pyramid processing may be used on the color features and edge features to generate color feature maps and edge features maps, respectively. Afterward, a mean of these extracted color feature maps and edge feature maps may be calculated to generate the saliency map. The saliency map may highlight the region-of-interest that can be further cropped for OCR identification.

At block 806, the NOC server 202 may downsample and crop an identified region-of-interest in the particular still image to remove the background of the still image that is outside the edges of the region-of-interest. In one example, pixel brightness of the edges of the region-of-interest can be used to identify the background from the foreground. In this example, the foreground may include the vehicle license plate, traffic signs, and/or the like.

At block 808, the NOC server 202 may use the OCR algorithm to read characters on the region-of-interest that includes a vehicle license plate.

At block 810, the NOC server 202 may compare a number of identified characters in the vehicle license plate with a character number threshold. For example, the character number threshold includes a total of six characters. In this example, the number of identified characters may be compared with the six characters—threshold. This example, however, may be applied only to standard vehicle license plates where a fix number of alphanumeric characters may be used as thresholds. In some embodiments, such as in the case of personalized license plates, the number of alphanumeric characters may not include a definite number. Accordingly, a different threshold such as manually entered threshold may be used for comparison with the number of identified characters on the region-of-interest.

At block 812, the NOC server 202 may re-adjust configurations of an imaging device based at least upon a comparison between the number of identified characters in the vehicle license plate and the character number threshold.

Example Implementation—Detecting Event Using Event Detector Models

Figure 9:
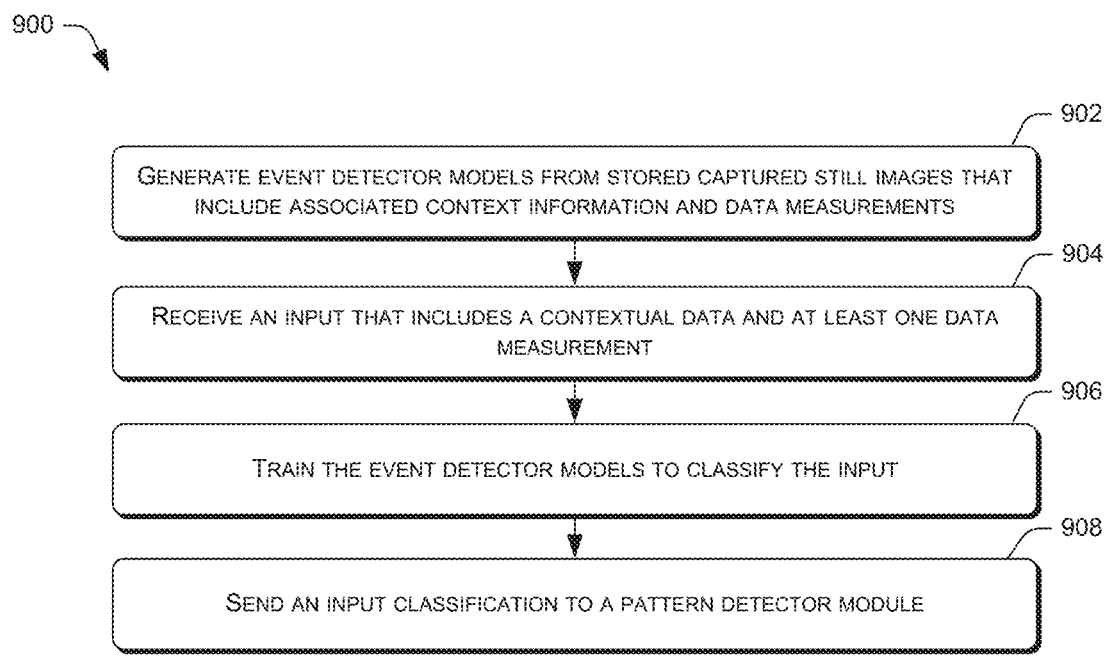
FIG. 9 is a flow diagram of an example methodological implementation for detecting the occurrence of the event using an event detector model.

FIG. 9 is a flow diagram 900 that depicts a methodological implementation of at least one aspect of the techniques for identifying characters of vehicle license plates. In the following discussion of FIG. 9, continuing reference is made to the elements and reference numerals shown in and described with respect to the NOC server 202 of FIG. 2. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 902, the NOC server 202 may generate event detector models from stored still images that include associated contextual data and data measurements. For example, the event detector module 172 may use learning modules 640 on training data to generate the event detector models 620. The training data may include the contextual data and data measurements associated with the stored detected events. In this example, the event detector module 172 may use the event detector models 620 to classify an input data such as the input 600 of FIG. 6.

At block 904, the NOC server 202 may receive an input that includes contextual data and at least one data measurement.

At block 906, the NOC server 202 may train the event detector models to classify the input. For example, the co-occurrence model 624 may be trained on the at least one or more data measurements to determine the likelihood of occurrence of the event. In another example, the context model 622 may be trained on contextual data such as current weather, presence of other vehicles or buildings, and/or other relevant information that may be associated with the at least one or more data measurements. In another example, the combination of the context model 622 and the co-occurrence model 624 may generate a third model that can be used to determine the likelihood of occurrence of the event. In this case, the third model may combine the features that can be used by the context model 622 and the co-occurrence model 624 in determining the likelihood of occurrence of the event.

At block 908, the NOC server may send an input classification to a pattern detector module. In one example, upon a classification of the input, the classification may be forwarded to the pattern detector module for further processing and implementation in a particular model.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
receiving, at a network operating center (NOC) server, a video being streamed by an imaging device;
receiving, at the NOC server, at least one data measurement taken during the video streaming via at least one sensor associated with the imaging device;
comparing the at least one data measurement with a corresponding event threshold;
automatically adjusting a configuration of the imaging device in response to a trigger that is based at least on a comparison between the at least one data measurement and the corresponding event; threshold, including:
activating a still image capturing function of the imaging device to capture a still image during the video streaming in addition to the video streaming; and
adjusting a configuration of the imaging device to enhance the still image;
receiving the enhanced still image; and
using an algorithm to identify a region-of-interest on the enhanced still image.

2. The computer-implemented method of claim 1, wherein the corresponding event threshold includes at least one of a vehicle speed threshold, a text similarity threshold, an impulse sound wave threshold, or a light intensity threshold.

3. The computer-implemented method of claim 2, wherein the at least one data measurement includes a detected vehicle speed measurement, audio-to-text translation, an impulse noise, or a revolving intensity light measurement at a fixed frequency.

4. The computer-implemented method of claim 3, wherein the configuration of the imaging device is adjusted when the detected vehicle speed measurement is zero or above the vehicle speed threshold, the audio-to-text translation exceeds the text-similarity threshold, the impulse noise is above the impulse sound wave threshold, or the revolving intensity light measurement at the fixed frequency is greater than the light intensity threshold.

5. The computer-implemented method of claim 1, wherein the at least one sensor that is associated with the imaging device includes at least one of a radar, light sensor, or an audio sensor.

6. The computer-implemented method of claim 1, wherein the region-of-interest includes a vehicle license plate.

7. The computer-implemented method of claim 6, further comprising:
identifying a pattern on the region-of-interest,
wherein an optical character recognition (OCR) is used to identify characters of the vehicle license plate from the pattern.

8. The computer-implemented method of claim 1 further comprising: using an event detector model to determine an occurrence of an event that triggers the adjusting of the configuration of the imaging device based at least on the comparison between the at least one data measurement and the corresponding event threshold.

9. The computer-implemented method of claim 8, wherein the event detector model includes a co-occurrence model that is trained on the at least one data measurement to determine a likelihood of the occurrence of the event.

10. A network server, comprising:
one or more processors; and
memory including a plurality of computer-executable components that are executable by the one or more processors to perform a plurality of actions, the plurality of actions comprising:
receiving, at a network operating center (NOC) server, a video being streamed by an imaging device;
receiving, at the NOC server, at least one data measurement taken during the video streaming via at least one sensor associated with the imaging device;
comparing the at least one data measurement with a corresponding event threshold;
automatically adjusting a configuration of the imaging device in response to a trigger that is based at least on a comparison between the at least one data measurement and the corresponding event threshold, including:
activating a still image capturing function of the imaging device to capture a still image during the video streaming in addition to the video streaming; and
adjusting a configuration of the imaging device to enhance the still image;
receiving the enhanced still image; and
using an algorithm to identify a region-of-interest on the received enhanced still image.

11. The network server of claim 10, wherein the corresponding event threshold includes at least one of a vehicle speed threshold, a text similarity threshold, an impulse sound wave threshold, or a light intensity threshold.

12. The network server of claim 11, wherein the at least one data measurement includes a detected vehicle speed measurement, audio-to-text translation, an impulse noise, or a revolving intensity light measurement at a fixed frequency.

13. The network server of claim 12, wherein the configuration of the imaging device is adjusted when the detected vehicle speed measurement is zero or above the vehicle speed threshold, the audio-to-text translation exceeds the text-similarity threshold, the impulse noise is above the impulse sound wave threshold, or the revolving intensity light measurement at the fixed frequency is greater than the light intensity threshold.

14. The network server of claim 10, wherein the at least one sensor that is associated with the imaging device includes at least one of a radar, light sensor, or an audio sensor.

15. The network server of claim 10, wherein the region-of-interest includes a vehicle license plate.

16. The network server of claim 15, further comprising:
identifying a pattern on the region-of-interest, wherein an optical character recognition (OCR) is used to identify characters of the vehicle license plate from the pattern.

17. The network server of claim 16, the plurality of acts further comprising: using an event detector model to determine an occurrence of an event that triggers the adjusting of the configuration of the imaging device based at least on the comparison between the at least one data measurement and the corresponding event threshold.

18. One or more non-transitory computer-readable storage media storing computer-executable instructions that upon execution cause one or more computers to collectively perform acts comprising:

receiving, at a network operating center (NOC) server, a video being streamed by an imaging device;

receiving, at the NOC server, at least one data measurement taken during the video streaming via at least one sensor associated with the imaging device;

comparing the at least one data measurement with a corresponding event threshold;

automatically adjusting a configuration of the imaging device in response to a trigger that is based at least on a comparison between the at least one data measurement and the corresponding event threshold, including:

activating a still image capturing function of the imaging device to capture a still image during the video streaming in addition to the video streaming; and adjusting a configuration of the imaging device to enhance the still image;

receiving the enhanced still image; and using a saliency map to identify a region-of-interest on the enhanced still image.

19. The one or more non-transitory computer-readable storage media of claim 18, wherein the region-of-interest includes a vehicle license plate.

20. The one or more non-transitory computer-readable storage media of claim 19, further comprising:

identifying a pattern on the region-of-interest;

wherein an optical character recognition (OCR) is used to identify characters of the vehicle license plate from the pattern.

* * * * *